3,507,836
PREPARATION OF POLYESTERS FROM A BIS-
HYDROXYALKYL ESTER OF AN AROMATIC
DICARBOXYLIC ACID
Mary E. Carter, Philadelphia, and Patricia A. Smith,
Parkside, Pa., assignors to FMC Corporation, Philadelphia, Pa., a corporation of Delaware
No Drawing. Filed July 19, 1967, Ser. No. 654,377
Int. Cl. C08g 17/013; C07c 67/00
U.S. Cl. 260—75                                  8 Claims

ABSTRACT OF THE DISCLOSURE

Process of preparing polyester resin comprising carrying out: (1) a condensation reaction between a bis-hydroxyalkyl ester of an aromatic dicarboxylic acid and an aromatic dicarboxylic acid in the presence of a salt, hydroxide, or oxide of a metal having an atomic number of at least 28 to form a polyester prepolymer; and then (2) polycondensing the resulting said polyester prepolymer in the presence of a conventional polycondensation catalyst.

---

This invention relates to a method of preparing linear polyesters. More particularly, it relates to a novel method of preparing highly polymeric linear polyesters which have excellent physical and chemical characteristics, so as to make them particularly suitable for filament-forming purposes.

In order for a polyester resin to be suitable for use in the preparation of fibers or filaments, it is essential that the resin be produced with a minimum of side reactions which result in the incorporation of linkages, such as ether linkages into the polymer chain. In particular, the preparation of polyethylene terephthalate is sometimes accompanied by large quantities of diethylene glycol and similar ethers which tend to become part of the polyester chain in the form of aliphatic ether linkages. Such modifications of the polyester chain result in the formation of a polymer which is generally considered not suitable for fiber production due to its susceptibility to heat and hydrolytic action.

In general, it is considered that a polyethylene terephthalate resin suitable for melt spinning into filaments should have a carboxyl content value of about or below 50 equivalents per million grams (eq./$10^6$ gr. or meq./kg.), an intrinsic viscosity preferably no less than about 0.60 (as determined in a 60% phenol and 40% tetrachloroethane solution, wt./wt., at 30° C.), and a diethylene glycol content preferably less than about 1%, by weight, in order for the resulting fibers to possess a satisfactory level of hydrolytic stability, heat stability, ultra-violet light stability, and a high degree of tenacity. It is generally known that polyethylene terephthalate resin containing not more than about 1% diethylene glycol by weight will have a melting point higher than 260° C. For fiber-forming purposes, a polyethylene terephthalate resin having a melting point of at least 258–260° C. is preferred.

It is an object of this invention to prepare polyester resin suitable for melt spinning into non-degradable, processable filaments by carrying out a reaction between a bis-hydroxyalkyl ester of an aromatic dicarboxylic acid and an aromatic dicarboxylic acid to form a polyester prepolymer and then polycondensing said polyester prepolymer.

Another object of the present invention is to provide an improved method for the preparation of filament-forming polyethylene terephthalate having a low ether content and, a suitably high intrinsic viscosity and melting point through the use of an improved first stage additive or buffer.

These and other objects are accomplished in accordance with the present invention which involves a method of preparing filament-forming polyesters comprising carrying out a condensation reaction between a bis-hydroxyalkyl ester of an aromatic dicarboxylic acid and an aromatic dicarboxylic acid in the presence of a catalytic amount of a salt, hydroxide, or oxide of a metal having an atomic number of at least 28 to form a polyester prepolymer and then polycondensing the resulting polyester prepolymer in the presence of a conventional polycondensation catalyst.

For purposes of simplicity, the term "bis-hydroxyalkyl ester" used hereinafter, will denote bis-hydroxyalkyl esters of aromatic dicarboxylic acids.

The present invention may be carried out in either a stepwise batch process or in a continuous process. In the practice of the present invention, the ratio of the bis-hydroxyalkyl ester to aromatic dicarboxylic acid used is in the range of from about 1.2:1 to about 3:1. However, in most instances, it has been found that the preferred ratio of bis-hydroxyalkyl ester to aromatic dicarboxylic acid is within the range of from about 1.5:1 to 2.5:1, in view of ease of handling, speed of reaction and improved polyester resin product obtained.

The salts, hydroxides, or oxides of metals having an atomic number of at least 28 which are used as first stage additives or buffers in the present method, may be suitably varied within the above description to meet specific reaction conditions or the demands of the product desired. For example, among the first stage additives that can be used in accordance with the present invention are barium oxide, bismuth hydroxide, lead carbonate, nickel silicate and zinc pyrophosphate or any combination thereof. The present salts, hydroxides, or oxides of a metal having an atomic number of at least 28 which are used as buffers in the present method are generally employed in amounts of from about $5 \times 10^{-6}$ mole to $5 \times 10^{-2}$ mole per mole of dicarboxylic acid in the subject bis-hydroxyalkyl ester-dicarboxylic acid reaction mixture. Higher or lower concentrations of the present buffer additives can also be used. However, when concentrations less than the above are used, their catalytic effect is generally reduced, whereas when concentrations greater than this are used, no further improvement in the desired product is generally obtained.

In general, the first stage of the present invention is carried out under superatmospheric pressure in the range of from about 40 p.s.i. to 100 p.s.i. in the absence of an oxygen-containing gas at a temperature within the range of from about 220° C. to 290° C. For example, nitrogen gas may be used. However, it has been found that the preferred temperature and pressure ranges are from about 250°–270° C. at from about 50–70 p.s.i., in view of the optimum rate of reaction achieved, ease of handling, and polyester resin produced.

According to the present process, when the first stage reaction mixture appears as a clear melt, the superatmospheric pressure is released, and then the resulting reaction mixture is further heated at a temperature of from about 220° C. to 290° C. at atmospheric pressure for 15 to 30 minutes in the absence of an oxygen-containing gas in order to remove any by-product water and, in some instances, a small quantity of glycol which has formed, and drive the condensation reaction to completion. Then the resulting polyester prepolymer is polycondensed in the second step of the present method in the presence of a conventional polycondensation catalyst at a temperature ranging from about 260–325° C. under reduced pressure of from about 0.05 to about 20 mm. of mercury for about 2 to 5 hours in the absence of an oxygen-containing gas to form a polyester resin.

Among the conventional polycondensation catalysts that can be used are, for example, antimony trioxide and the like. The polycondensation catalyst may be added to the present mixture before initiating the reaction between the bis-hydroxyalkyl ester and aromatic dicarboxylic acid or after the reaction product thereof, or prepolymer, is formed. The polycondensation catalysts are generally employed in concentrations ranging from about 0.005 to about 0.5% based on the weight of the prepolymer.

The following examples of several preferred embodiments will further serve to illustrate the present invention. All parts are by weight, unless otherwise indicated.

EXAMPLES

A mixture of 60 g. of bis-2-hydroxyethyl terephthalate, 19.6 g. of terephthalic acid and $0.25 \times 10^{-4}$ mole of a first stage additive, as listed in the following table with exact weight used, was charged to a Fischer-Porter pressure assembly equipped with a nitrogen sparge tube and a distilling arm. The reaction vessel was lowered into an oil bath maintained at 260° C. and flushed for ten minutes with dry nitrogen. A nitrogen pressure of 60 p.s.i. was applied and a distillate of water-ethylene glycol was collected. When a clear reaction mixture, i.e. solution, was obtained (after about three hours), the pressure was reduced to atmospheric and the remaining excess water-glycol mixture was distilled. Then the resulting low molecular weight prepolymer was further reacted (polycondensed) in the presence of 0.04%, based on the weight of the prepolymer, of antimony trioxide under a vacuum of about 0.1 mm. of mercury at 280° C. for four hours to form a polyester resin.

The following table sets forth conditions and results of various reactions carried out as described above.

ponent contains from 1 to 10 carbon atoms. The aromatic dicarboxylic acid component of the reaction mixture of the present method can also be suitably varied within such limits as set forth in relation to acid precursors of the bis-hydroxyalkyl esters.

We claim:
1. In a process of preparing linear polyester resins wherein a bis-hydroxyalkyl ester of an aromatic dicarboxylic acid and an aromatic dicarboxylic acid are subjected to a condensation reaction and then the product of the condensation reaction is polycondensed in the presence of a polycondensation catalyst, the improvement comprising carrying out the said condensation reaction in the presence of a catalytic amount of a first stage catalytic additive selected from the group consisting of bismuth hydroxide, nickel silicate, and zinc pyrophosphate.

2. The method of claim 1 wherein the bis-hydroxyalkyl ester of a dicarboxylic acid is bis-2-hydroxyethyl terephthalate.

3. The process of claim 1 wherein the aromatic dicarboxylic acid is terephthalic acid.

4. The process of claim 1 wherein the first stage additive is present in an amount ranging from about $5 \times 10^{-6}$ to $5 \times 10^{-2}$ mole per mole of dicarboxylic acid in the reaction mixture.

5. The process of claim 1 wherein the first stage additive is nickel silicate.

6. The process of claim 1 wherein the first stage additive is zinc pyrophosphate.

7. The process of claim 1 wherein the first stage additive is bismuth hydroxide.

8. The process of claim 1 wherein the bis-hydroxyalkyl ester of a dicarboxylic acid is bis-2-hydroxyethyl ter-

TABLE

| Ex. No. | First stage additive | Weight of first stage additive, gms. | Prepolymer carboxyl content, meq./kg. | Prepolymer DEG content, wt. percent | Polymer intrinsic viscosity | Polymer carboxyl content, meq./kg. | Polymer DEG content, wt. percent |
|---|---|---|---|---|---|---|---|
| I | Barium oxide BaO | .0038 | 63 | 0.69 | .73 | 28 | 1.0 |
| II | Bismuth hydroxide $Bi(OH)_3$ | .0065 | 27 | 0.69 | .72 | 36 | 1.1 |
| III | Lead carbonate $PbCO_3$ | .0067 | 44 | 0.53 | .77 | 36 | 0.9 |
| IV | Nickel silicate, meta $NiSiO_3$ | .0039 | 35 | 0.62 | .56 | 29 | 0.9 |
| V | Zinc pyrophosphate $Zn_2P_2O_7$ | .0076 | 66 | 0.55 | .66 | 24 | 0.7 |

The intrinsic viscosities of the polyester resin products in the above examples were determined in a 60% phenol and 40% tetrachloroethane solution, wt./wt., at 30° C. The other analytical values were obtained by conventional quantitative laboratory procedures.

The results in the above examples indicate that highly polymeric linear polyesters can be produced by the subject method. The polyester resin products produced via the present method were characterized by high molecular weights, as indicated by their intrinsic viscosities, low carboxyl contents and low diethylene glycol contents.

While the process of the present invention has been illustrated with particular reference to polyethylene terephthalate, the subject invention also includes within its scope the preparation of other similar polyesters formed from bis-hydroxyalkyl esters derived from any suitable aromatic dicarboxylic acid such as isophthalic acid, and 4,4'-diphenyldicarboxylic acid and wherein the alkyl comephthalate and the aromatic dicarboxylic is terephthalic acid.

References Cited

UNITED STATES PATENTS 3,070,575  12/1962  Cramer _____ 260—75
3,245,959  4/1966   Roeser _____ 260—75

FOREIGN PATENTS 1,297,516  5/1962  France.
1,456,345  9/1966  France.

WILLIAM H. SHORT, Primary Examiner

L. P. QUAST, Assistant Examiner

U.S. Cl. X.R.

260—475